United States Patent
Ranki et al.

(10) Patent No.: US 9,674,652 B2
(45) Date of Patent: Jun. 6, 2017

(54) POSITIONING DEVICES

(75) Inventors: Ville Valtteri Ranki, Jorvas (FI); Antti Paavo Tapani Kainulainen, Siilinjärvi (FI); Kimmo Heikki Juhana Kalliola, Espoo (FI); Fabio Belloni, Espoo (FI)

(73) Assignee: Nokia Technologies Oy, Espoo (FI)

( * ) Notice: Subject to any disclaimer, the term of this patent is extended or adjusted under 35 U.S.C. 154(b) by 83 days.

(21) Appl. No.: 14/421,705

(22) PCT Filed: Aug. 31, 2012

(86) PCT No.: PCT/IB2012/054491
§ 371 (c)(1),
(2), (4) Date: Feb. 13, 2015

(87) PCT Pub. No.: WO2014/033500
PCT Pub. Date: Mar. 6, 2014

(65) Prior Publication Data
US 2015/0215732 A1    Jul. 30, 2015

(51) Int. Cl.
*H04W 4/02*   (2009.01)
*H04W 52/02*  (2009.01)
(Continued)

(52) U.S. Cl.
CPC .............. *H04W 4/02* (2013.01); *G01S 1/08* (2013.01); *G01S 5/0221* (2013.01);
(Continued)

(58) Field of Classification Search
None
See application file for complete search history.

(56) References Cited

U.S. PATENT DOCUMENTS

| | | | |
|---|---|---|---|
| 667,646 | A | 2/1901 | Bergier |
| 2,836,816 | A | 5/1958 | Allison et al. |

(Continued)

FOREIGN PATENT DOCUMENTS

| | | |
|---|---|---|
| EP | 0897233 | 2/1999 |
| EP | 1148684 A2 | 10/2001 |

(Continued)

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN(Release 10)", 3GPP TS 36.305, V10.0.0, Dec. 2010, pp. 1-51.

(Continued)

*Primary Examiner* — Vinncelas Louis
(74) *Attorney, Agent, or Firm* — Locke Lord LLP

(57) ABSTRACT

An apparatus configured at least to perform: receiving a signal constituting a positioning packet at a positioning device; processing the signal by: demodulating a header of the positioning packet from the signal; extracting an identifier from the header of the positioning packet; part processing samples of the signals; and forming a message from the part-processed samples; in response to receiving the signal, deactivating a receiver circuit of the positioning device for a period of time, the period of time constituting a sum of a time taken by the positioning device to process the signal and a preconfigured or random delay time; and activating the receiver circuit of the positioning device immediately subsequent the period of time.

19 Claims, 5 Drawing Sheets

(51) Int. Cl.
| | |
|---|---|
| *G06F 1/32* | (2006.01) |
| *G01S 1/08* | (2006.01) |
| *G06K 7/10* | (2006.01) |
| *H01Q 21/00* | (2006.01) |
| *H04W 64/00* | (2009.01) |
| *G01S 5/02* | (2010.01) |
| *H04L 29/06* | (2006.01) |

(52) U.S. Cl.
CPC ............ *G06F 1/3287* (2013.01); *G06K 7/10* (2013.01); *H01Q 21/00* (2013.01); *H04L 69/22* (2013.01); *H04W 52/0274* (2013.01); *H04W 64/00* (2013.01); *Y02B 60/50* (2013.01)

(56) References Cited

U.S. PATENT DOCUMENTS

| | | | |
|---|---|---|---|
| 3,746,846 | A | 7/1973 | Weihe |
| 3,838,427 | A | 9/1974 | King et al. |
| 3,949,399 | A | 4/1976 | Huber et al. |
| 3,958,244 | A | 5/1976 | Lee et al. |
| 5,740,048 | A | 4/1998 | Abel et al. |
| 5,859,612 | A | 1/1999 | Gilhousen |
| 6,064,340 | A | 5/2000 | Croft et al. |
| 6,195,046 | B1 | 2/2001 | Gilhousen |
| 6,217,132 | B1 | 4/2001 | Gualdoni et al. |
| 6,321,092 | B1 | 11/2001 | Fitch et al. |
| 6,437,739 | B1 | 8/2002 | Schulte et al. |
| 6,842,444 | B2 | 1/2005 | Bolgiano et al. |
| 7,116,988 | B2 | 10/2006 | Dietrich et al. |
| 7,495,614 | B2 | 2/2009 | Small |
| 7,548,203 | B2 | 6/2009 | Kalliola et al. |
| 7,667,646 | B2 | 2/2010 | Kalliola et al. |
| 7,940,752 | B2* | 5/2011 | Ryu .................. H04B 1/7117 370/342 |
| 8,179,318 | B1 | 5/2012 | Furman et al. |
| 8,417,258 | B2 | 4/2013 | Barnes, Jr. |
| 8,498,577 | B2 | 7/2013 | Achkar et al. |
| 9,125,165 | B2* | 9/2015 | Gonikberg ............ H04W 64/00 |
| 2001/0047229 | A1 | 11/2001 | Staggs |
| 2002/0122003 | A1 | 9/2002 | Patwari et al. |
| 2002/0123357 | A1* | 9/2002 | Abrishamkar ...... H04W 68/025 455/458 |
| 2002/0167417 | A1 | 11/2002 | Welles, II et al. |
| 2003/0002471 | A1 | 1/2003 | Crawford et al. |
| 2003/0197645 | A1 | 10/2003 | Ninomiya et al. |
| 2003/0202468 | A1 | 10/2003 | Cain et al. |
| 2004/0162084 | A1 | 8/2004 | Wang |
| 2005/0135292 | A1 | 6/2005 | Graumann |
| 2005/0254608 | A1 | 11/2005 | Lee et al. |
| 2006/0052112 | A1 | 3/2006 | Baussi et al. |
| 2006/0052115 | A1 | 3/2006 | Khushu |
| 2006/0087475 | A1 | 4/2006 | Struckman |
| 2006/0148488 | A1 | 7/2006 | Syrbe |
| 2006/0205417 | A1 | 9/2006 | Ju et al. |
| 2006/0290499 | A1 | 12/2006 | Chang |
| 2007/0197229 | A1 | 8/2007 | Kalliola et al. |
| 2007/0247367 | A1 | 10/2007 | Anjum et al. |
| 2008/0100502 | A1 | 5/2008 | Jantunen et al. |
| 2008/0182592 | A1 | 7/2008 | Cha et al. |
| 2008/0191941 | A1 | 8/2008 | Saban et al. |
| 2008/0204322 | A1 | 8/2008 | Oswald et al. |
| 2008/0297401 | A1 | 12/2008 | Nishida |
| 2008/0311957 | A1 | 12/2008 | Jantunen et al. |
| 2009/0060076 | A1 | 3/2009 | Ma et al. |
| 2009/0082019 | A1 | 3/2009 | Marsico |
| 2010/0075603 | A1 | 3/2010 | Newton et al. |
| 2010/0183099 | A1 | 7/2010 | Toda et al. |
| 2010/0195754 | A1 | 8/2010 | Li et al. |
| 2010/0259450 | A1 | 10/2010 | Kainulainen et al. |
| 2010/0302102 | A1 | 12/2010 | Desai et al. |
| 2010/0331019 | A1* | 12/2010 | Bhattacharjee ... H04W 52/0229 455/458 |
| 2011/0051640 | A1* | 3/2011 | Ramesh ................ H04W 48/14 370/311 |
| 2011/0110293 | A1* | 5/2011 | Hart ..................... G01S 5/0009 370/328 |
| 2011/0117924 | A1* | 5/2011 | Brunner ................ G01S 5/0252 455/456.1 |
| 2011/0223940 | A1 | 9/2011 | Zhong et al. |
| 2011/0319020 | A1 | 12/2011 | Desai et al. |

FOREIGN PATENT DOCUMENTS

| | | |
|---|---|---|
| EP | 1329737 A2 | 7/2003 |
| EP | 0937368 B1 | 4/2004 |
| EP | 1731919 A1 | 12/2006 |
| EP | 1786143 A2 | 5/2007 |
| EP | 2110965 A2 | 10/2009 |
| EP | 2261688 A1 | 12/2010 |
| GB | 2048619 | 12/1980 |
| JP | 5297098 A | 11/1993 |
| JP | 2007-139521 A | 6/2007 |
| JP | 2011-089947 A | 5/2011 |
| WO | 97/14257 A1 | 4/1997 |
| WO | 98/19488 A1 | 5/1998 |
| WO | 03/073647 A1 | 9/2003 |
| WO | 2004/059251 A1 | 7/2004 |
| WO | 2005/002070 A2 | 1/2005 |
| WO | 2007/026137 A1 | 3/2007 |
| WO | 2007/145890 A2 | 12/2007 |
| WO | 2009/022192 A1 | 2/2009 |
| WO | 2010/040392 A1 | 4/2010 |
| WO | 2011/131745 A1 | 10/2011 |
| WO | 2012/008110 A1 | 1/2012 |
| WO | 2012042315 | 4/2012 |

OTHER PUBLICATIONS

"Evolved Universal Terrestrial Radio Access Network (E-UTRAN);Stage 2 functional specification of User Equipment (UE)positioning in E-UTRAN (3GPP TS 36.305 version 9.6.0 Release 9)", ETSI TS 136 305, V9.6.0, Apr. 2011, pp. 1-54.

"Spot: Secure Positioning (Localization)", ETH Zurich, Retrieved on May 9, 2016, Webpage available at : http://www.syssec.ethz.ch/research/spot.html.

Tang et al., "Synchronization Schemes for Packet OFDM System", IEEE International Conference on Communications, vol. 5, May 11-15, 2003, pp. 3346-3350.

"OFDM Synchronization", Wireless Access tech lab, 74 Pages.

International Search Report and Written Opinion received for corresponding Patent Cooperation Treaty Application No. PCT/FI2012/050386, dated Aug. 20, 2012, 13 pages.

Bayed et al., "Network-Based Wireless Location", IEEE Signal Processing Magazine, vol. 22, No. 4, Jul. 2005, pp. 24-40.

International Search Report and Written Opinion received for corresponding Patent Cooperation Treaty Application No. PCT/IB2011/055556, dated Sep. 21, 2012, 13 pages.

Ferreres et al., "Guaranteeing The Authenticity Of Location Information", IEEE Pervasive Computing, vol. 7, No. 3, Jul.-Sep., 2008, pp. 72-80.

International Search Report and Written Opinion received for corresponding Patent Cooperation Treaty Application No. PCT/IB2012/052780, dated Sep. 28, 2012, 15 pages.

International Search Report and Written Opinion received for corresponding Patent Cooperation Treaty Application No. PCT/IB2012/053340, dated Nov. 21, 2012, 15 pages.

International Search Report and Written Opinion received for corresponding Patent Cooperation Treaty Application No. PCT/IB2011/055792, dated Nov. 28, 2012, 24 pages.

Non-Final Office action received for corresponding U.S. Appl. No. 13/106,607, dated Aug. 5, 2013, 09 pages.

"Bluetooth Specification V4.0", Bluetooth, vol. 1, Jun. 30, 2010, 2302 pages.

Extended European Search Report received for corresponding European Patent Application No. 12793270.5, dated Feb. 4, 2015, 7 pages.

Extended European Search Report received for corresponding European Patent Application No. 12811954.2, dated Feb. 6, 2015, 7 pages.

(56) References Cited

OTHER PUBLICATIONS

Extended European Search Report received for corresponding European Patent Application No. 12782770.7, dated Mar. 6, 2015, 7 pages.
Non-Final Office action received for corresponding U.S. Appl. No. 14/363,300, dated Mar. 6, 2015, 7 pages.
Extended European Search Report received for corresponding European Patent Application No. 11876899.3, dated Jun. 8, 2015, 8 pages.
Wei et al., "AOD/AOA/TOA-Based 3D Positioning In NLOS Multipath Environments", IEEE 22nd International Symposium on Personal, Indoor and Mobile Radio Communications, Sep. 11-14, 2011, pp. 1289-1293.
Gierlich et al., "A Reconfigurable MIMO System for High-Precision FMCW Local Positioning", IEEE Transactions on Microwave Theory and Techniques, vol. 59, No. 12, Dec. 2011, pp. 3228-3238.
Non-Final Office action received for corresponding U.S. Appl. No. 14/122,817, dated Aug. 28, 2015, 10 pages.
Extended European Search Report received for corresponding European Patent Application No. 11877658.2, dated Sep. 1, 2015, 7 pages.
Non-Final Office action received for corresponding U.S. Appl. No. 14/363,300, dated Sep. 24, 2015, 5 pages.
Non-Final Office action received for corresponding U.S. Appl. No. 14/131,714, dated Oct. 8, 2015, 10 pages.
Office action received for corresponding Chinese Patent Application No. 201180076385.4, dated Oct. 9, 2015, 6 pages of office action and no pages of office action translation available.
Non-Final Office action received for corresponding U.S. Appl. No. 14/362,396, dated Dec. 16, 2015, 33 pages.
Final Office action received for corresponding U.S. Appl. No. 14/131,714, dated Mar. 7, 2016, 11 pages.
Office action received for corresponding European Patent Application No. 07819402.4, dated Mar. 15, 2016, 4 pages.
International Search Report and Written Opinion received for corresponding Patent Cooperation Treaty Application No. PCT/IB2012/054491, dated May 7, 2013, 13 pages.
Towsley D. et al. "A Comparison of Sender-Initiated and Receiver-Initiated Reliable Mulitcast Protocols,", IEEE Journal on Selected Areas iin Comunications, vol. 15, No. 3, pp. 398-406, 1997.
"Welcome to Wireless Nets", Wireless Nets Independent Consulting, Retrieved on Mar. 19, 2016, Webpage available at : http://www.wireless-nets.com/index.htm.
Battiti et al., "Optimal Wireless Access Point Placementfor Location-Dependent Services", Technical Report, DIT—03—052, Oct. 2003, pp. 1-12.
"Radio Channel Measurement and Research", EB Propsound CS, Retrieved on Mar. 19, 2016, Webpage available at : http://www.elektrobit.com/index.php?209.
"The Ultimate Technology in Radio Propagation Measurement", EB Propsound CS, Retrieved on Mar. 19, 2016, Webpage available at : https://www.elektrobit.com/.
Kalliola, "Experimental Analysis of Multidimensional Radio Channels", Thesis, Report S 251, Feb. 2002, pp. 1-54.
International Search Report and Written Opinion received for corresponding Patent Cooperation Treaty Application No. PCT/EP2007/009360, dated Aug. 14, 2008, 17 pages.
The Written Opinion for PCT Application No. PCT/EP2007/009360; Filed Oct. 29, 2007.
Krim et al., "Two Decades Of Array Signal Processing Research", IEEE Signal Processing Magazine, vol. 13, No. 4, Jul. 1996, pp. 67-94.
Office action received for corresponding European Patent Application No. 07819402.4, dated Nov. 18, 2010, 6 pages.
Office action received for corresponding European Patent Application No. 07819402.4, dated Dec. 20, 2011, 4 pages.
Office action received for corresponding Chinese Patent Application No. 200780101323.8, dated Feb. 3, 2012, 4 pages of office action and 5 pages of office action translation available.
Non-Final Office action received for corresponding U.S. Appl. No. 12/740,634, dated Jun. 21, 2012, 11 pages.
Final Office action received for corresponding U.S. Appl. No. 12/740,634, dated Nov. 29, 2012, 12 pages.
Extended European Search Report received for corresponding European Patent Application No. 12192669.5, dated Dec. 18, 2012, 9 pages.
Abdat et al., "Survey on Indoor Wireless Positioning Techniques: Towards Adaptive Systems", International Conference on Distributed Framework and Applications, Aug. 2-3, 2010, pp. 1-5.
Ferreres et al., "Guaranteeing The Authenticity Of Local Information", IEEE Pervasive Computing, vol. 7, No. 3, Jul.-Sep. 2008, pp. 72-80.
Kemppi et al., "Hybrid Positioning System Combining Angle-Based Localization, Pedestrian Dead Reckoning and Map Filtering", International Conference on Indoor Positioning and Indoor Navigation, Sep. 15-17, 2010, pp. 1-7.
Papapostolou et al., "Exploiting Multi-modality and Diversity for Localization Enhancement: WiFi & RFID Usecase", IEEE 20th International Symposium on Personal, Indoor and Mobile Radio Communications, 2009, pp. 1903-1907.
Singelee et al., "Location Verification Using Secure Distance Bounding Protocols", IEEE International Conference on Mobile Adhoc and Sensor Systems Conference, Nov. 7-7, 2005, 7 pages.
Vora et al., "Secure Location Verification Using Radio Broadcast", IEEE Transactions on Dependable and Secure Computing, vol. 3, No. 4, Oct.-Dec. 2006, pp. 377-385.
International Search Report and Written Opinion received for corresponding Patent Cooperation Treaty Application No. PCT/IB2011/052780, dated Sep. 12, 2011, 07 pages.
Office action received for corresponding Chinese Patent Application No. 200780101323.8, dated Jan. 7, 2013, 8 pages of office action and 1 pages of office action translation available.
International Search Report and Written Opinion received for corresponding Patent Cooperation Treaty Application No. PCT/IB2011/055792, dated Nov. 28, 2012, 16 pages.
Non-Final Office action received for corresponding U.S. Appl. No. 12/740,634, dated Mar. 15, 2013, 11 pages.
Office action received for corresponding Chinese Patent Application No. 200780101323.8, dated Jun. 3, 2013, 6 pages of office action and 1 pages of office action translation available.
Non-Final Office action received for corresponding U.S. Appl. No. 12/740,634, dated Aug. 14, 2013, 20 pages.
Zagami et al., "Providing Universal Location Services Using a Wireless E911 Location Network", IEEE Communications Magazine, vol. 36, No. 4, Apr. 1998, pp. 66-71.
Bahl et al., "Radar: An In-Building RF-Based User Location and Tracking System", IEEE Conference on Computer communications, 2000, pp. 1-11.
Najar et al., "Kalman Tracking For UMTS Mobile Location", IST Mobile Summit, Sep. 2001, 6 pages.
Ghosh et al., "A Hybrid Distance-Measurement/Angle-Of-Arrival Approach To Localization", Proceedings of the Australasian Telecommunication Networks and Applications Conference (ATNAC), Dec. 7-10, 2008, pp. 230-234.
Office action received for corresponding European Patent Application No. 12192669.5, dated Sep. 19, 2013, 6 pages.
Office action received for corresponding European Patent Application No. 07819402.4, dated Sep. 25, 2013, 7 pages.
Office action received for corresponding Chinese Patent Application No. 200780101323.8, dated Dec. 23, 2013, 6 pages of office action and 3 pages of office action translation available.
Final Office action received for corresponding U.S. Appl. No. 12/740,634, dated Apr. 2, 2014, 18 pages.
Office action received for corresponding European Patent Application No. 07819402.4, dated Sep. 11, 2015, 4 pages.
Office action received for corresponding Chinese Patent Application No. 200780101323.8, dated Dec. 18, 2015, 13 pages of office action and 3 pages of office action translation available.

(56) References Cited

OTHER PUBLICATIONS

Extended European Search Report received for corresponding European Patent Application No. 12883832.3, dated Jan. 20, 2016, 5 pages.

* cited by examiner

POSITIONING DEVICES

RELATED APPLICATION

This application was originally filed as PCT Application No. PCT/IB2012/054491 filed Aug. 31, 2012.

FIELD OF THE INVENTION

This invention relates to positioning devices.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

An indoor positioning system using positioning receivers that calculate a bearing from which signals are received has been proposed and is described in WO2012/042315 and some other publications.

SUMMARY OF THE INVENTION

A first aspect of the invention provides a method comprising:
  receiving a signal constituting a positioning packet at a positioning device;
  processing the signal by:
    demodulating a header of the positioning packet from the signal;
    extracting an identifier from the header of the positioning packet;
    part processing samples of the signals; and
    forming a message from the part-processed samples;
  in response to receiving the signal, deactivating a receiver circuit of the positioning device for a period of time, the period of time constituting a sum of a time taken by the positioning device to process the signal and a preconfigured or random delay time; and
  activating the receiver circuit of the positioning device immediately subsequent the period of time.

The delay time may be a preconfigured delay time. The delay time of a receiver circuit in a second positioning device may be different to that of the first positioning device. The preconfigured delay time may be transmitted to the positioning device after installation.

The preconfigured delay time may be programmed into the positioning device during manufacture or initial configuration.

The delay time may be in whole or in part a random delay time. Here, the delay time may be a random delay time that is less than 10 milliseconds, optionally less than 5 milliseconds.

The signals received at each of at least three antenna elements forming part of the positioning device may be Bluetooth low energy signals.

Processing may further comprise transmitting the message. Processing may further comprise transmitting the complex signal parameters and the identifier to a position calculating device.

Part processing may comprise determining a bearing of the transmitting device from the positioning device.

The invention also comprises a computer program comprising machine readable instructions that when executed by computing apparatus control it to perform the method of any preceding claim.

A second aspect of the invention provides apparatus comprising:
  a receiver configured to receive a signal constituting a positioning packet at a positioning device;
  a processing arrangement configured to process the signal by:
    demodulating a header of the positioning packet from the signal;
    extracting an identifier from the header of the positioning packet;
    part processing samples of the signals; and
    forming a message from the part-processed samples;
  a deactivating arrangement configured, in response to receiving the signal, to deactivate a receiver circuit of the positioning device for a period of time, the period of time constituting a sum of a time taken by the positioning device to process the signal and a preconfigured or random delay time; and
  an activating arrangement configured to activate the receiver circuit of the positioning device immediately subsequent the period of time.

The delay time may be a preconfigured delay time. The delay time of a receiver circuit in a second positioning device may be different to that of the first positioning device.

The preconfigured delay time may be transmitted to the positioning device after installation.

The preconfigured delay time may be programmed into the positioning device during manufacture or initial configuration.

The delay time may be in whole or in part a random delay time.

The delay time may be a random delay time that may be less than 10 milliseconds, optionally less than 5 milliseconds.

The signals received at each of at least three antenna elements forming part of the positioning device are Bluetooth low energy signals.

The processing arrangement may comprise a transmitter arrangement configured to transmit the message.

The processing arrangement may comprise a transmitter arrangement configured to transmit the complex signal parameters and the identifier to a position calculating device.

The processing arrangement may be configured to part process the signals by determining a bearing of the transmitting device from the positioning device.

A third aspect of the invention provides apparatus comprising at least one processor and at least one memory including computer program code, the at least one memory and the computer program code configured to, with the at least one processor, cause the apparatus at least to perform:
  receiving a signal constituting a positioning packet at a positioning device;
  processing the signal by:
    demodulating a header of the positioning packet from the signal;
    extracting an identifier from the header of the positioning packet;
    part processing samples of the signals; and
    forming a message from the part-processed samples;
  in response to receiving the signal, deactivating a receiver circuit of the positioning device for a period of time, the period of time constituting a sum of a time taken by the positioning device to process the signal and a preconfigured or random delay time; and activating the receiver circuit of the positioning device immediately subsequent the period of time.

A fourth aspect of the invention provides a computer readable medium having stored thereon machine readable instructions that when executed by computing apparatus of a positioning device control it to perform a method comprising:

receiving a signal constituting a positioning packet at the positioning device;

processing the signal by:
  demodulating a header of the positioning packet from the signal;
  extracting an identifier from the header of the positioning packet;
  part processing samples of the signals; and
  forming a message from the part-processed samples;

in response to receiving the signal, deactivating a receiver circuit of the positioning device for a period of time, the period of time constituting a sum of a time taken by the positioning device to process the signal and a preconfigured or random delay time; and activating the receiver circuit of the positioning device immediately subsequent the period of time.

BRIEF DESCRIPTION OF THE DRAWINGS

For a better understanding of various embodiments of the present invention reference will now be made by way of example only to the accompanying drawings in which.

DETAILED DESCRIPTION OF EMBODIMENTS OF THE INVENTION

Figure 1:
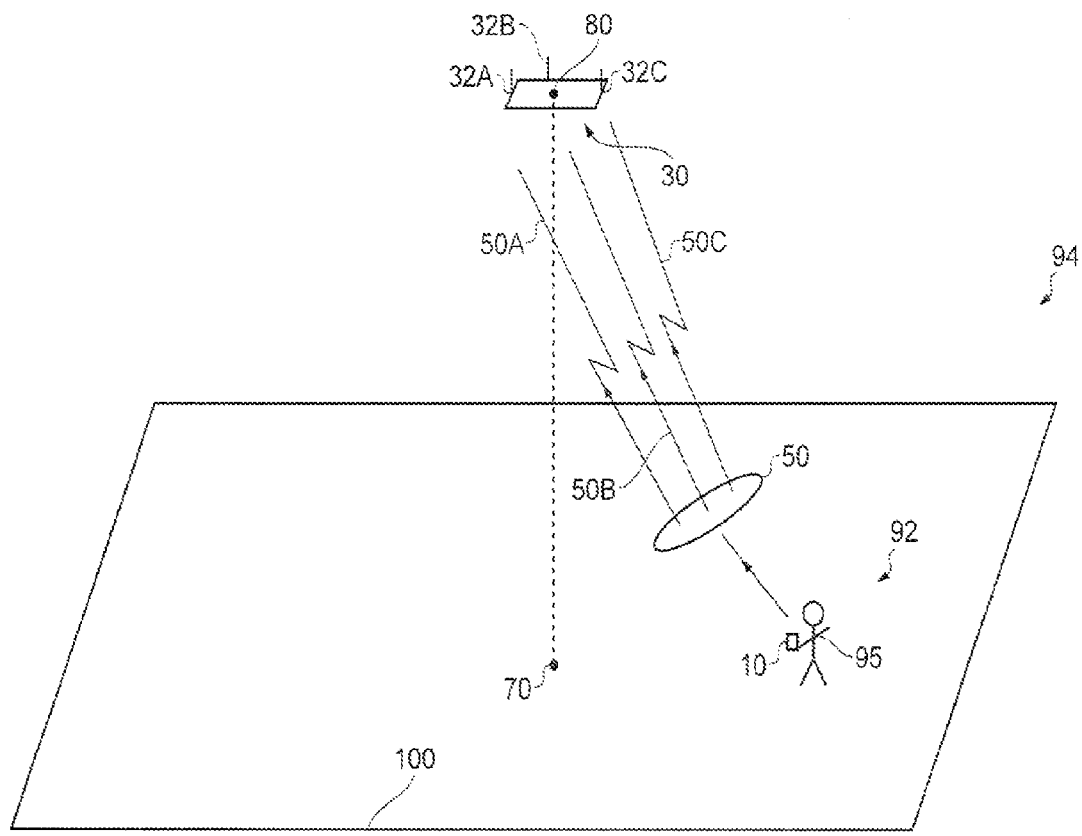
FIG. 1 illustrates an apparatus according to aspects of the invention receiving radio signals from a transmitter.

FIG. 1 illustrates a person 92 (carrying a mobile radio communications apparatus 10) at a position 95 on a floor 100 of a building 94. The building 94 could be, for example, a shopping centre or a conference centre.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere, such as on a wall or within an under-floor cavity. For reasons that will become apparent, the base station receiver apparatus 30 can be termed a positioning receiver.

The location 80 is directly above the point denoted with the reference numeral 70 on the floor 100 of the building. The receiver apparatus 30 is for enabling the position of the mobile apparatus 10 to be determined, although that is not necessarily the only function provided by the receiver apparatus 30. For example, the receiver apparatus 30 may be part of a transceiver for providing wireless internet access to users of mobile apparatuses 10, for example, via Bluetooth Low Energy (BT LE) protocol signals or wireless local area network (WLAN) radio signals.

Briefly, the mobile device 10 transmits signals in the form of positioning packets which are received at the base station receiver apparatus 30. The mobile device 10 is operable to transmit radio signals that are receivable by the base station 30, for instance Bluetooth Low Energy protocol signals. The base station receiver apparatus 30 takes I and Q samples, and transmits them to a bearing calculation apparatus for processing.

The bearing calculation apparatus may be the mobile device 10, a server apparatus (not shown) that is separate from the mobile device 10, or by another base station receiver apparatus 30, for instance. The bearing calculation apparatus then uses the received samples to estimate a bearing of the mobile device 10 from the base station receiver apparatus 30. From the bearing, the bearing calculation apparatus may calculate the location of the mobile device 10. Bearings from the mobile device 10 to plural base station receiver apparatuses 30 can be used to improve the accuracy of the location determination.

Alternatively, a mobile tag other than the mobile device 10 may transmit signals which are received by the base station receiver apparatus 30, and the bearing calculation apparatus may use I and Q samples of these signals to calculate a bearing of the mobile tag from the base station receiver apparatus 30. Here, the mobile tag 10 may be absent of a receiver. A mobile tag is absent of voice communication capability, and may also be absent of a display and audio transducers.

The position 95 of the person 92 is defined by specifying a position along a bearing 82 which runs from the location 80 of the receiver apparatus 30 through the location 95 of the mobile apparatus 10. The bearing 82 is defined by an elevation angle $\theta$ and an azimuth angle $\phi$.

The mobile apparatus 10 may, for example, be a hand portable electronic device such as a mobile radiotelephone. The mobile apparatus 10 may transmit radio signals 50 periodically as beacons.

The radio signals may, for example, have a transmission range of 100 meters or less. For example, the radio signals may be 802.11 wireless local area network (WLAN) signals, Bluetooth signals, Ultra wideband (UWB) signals or Zigbee signals.

Figure 2:
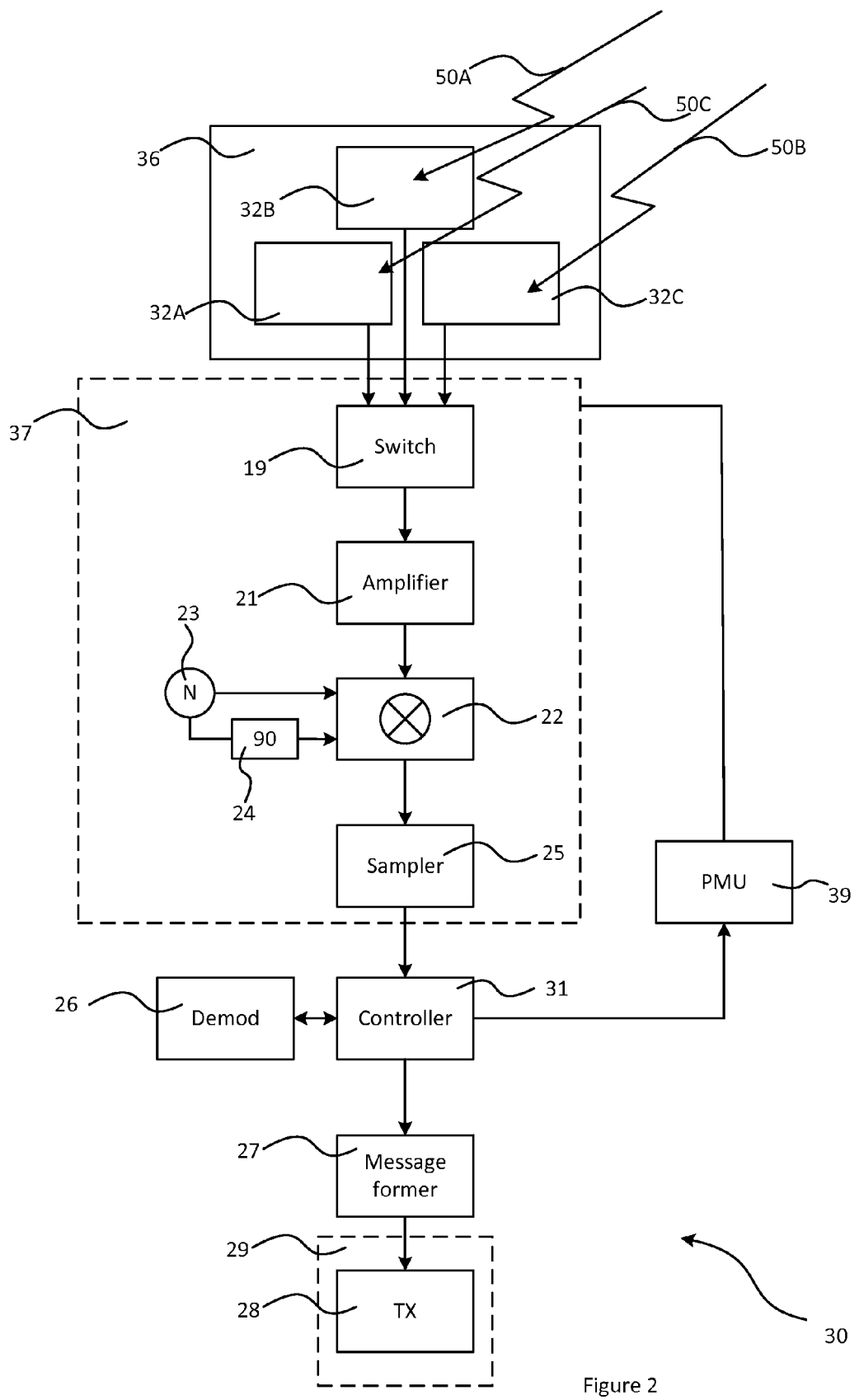
FIG. 2 is a schematic diagram of a receiver apparatus according to aspects of the invention [we are expecting a replacement for this figure, with the chipsets clearly defined]

FIG. 2 schematically illustrates one example of the base station receiver apparatus 30. The receiver apparatus 30 comprises an antenna array 36 comprising a plurality of antenna elements 32A, 32B, 32C which receive respective radio signals 50A, 50B, 50C transmitted from the mobile apparatus 10. Although three antenna elements are shown, three is the minimum and the embodiments described here may include more.

Each of the plurality of antenna elements 32A, 32B, 32C is connected to a switch 19, which is controllable by a controller 31 as described below. The switch 19 is controlled so that only one of the antenna elements 32A, 32B, 32C is connected to an amplifier 21, such as a low noise amplifier or LNA, at a given time. The output of the amplifier 21 is received at a mixer arrangement 22. This is provided with in-phase (I) and quadrature (Q) signals by an arrangement of a local oscillator 23, which may be analogue or digital, and a 90° phase shifter 24. A sampler 25 is configured to receive I and Q output signals from the mixer arrangement and take digital samples thereof. The sampler 25 may take any suitable form, for instance including two analogue to digital converter (ADC) channels, one for the I channel and one for the Q channel. The effect of the mixer arrangement 24 and the sampler 25 is to downconvert the received signals and to provide digital I and Q samples of the downmixed signals.

Figure 3:
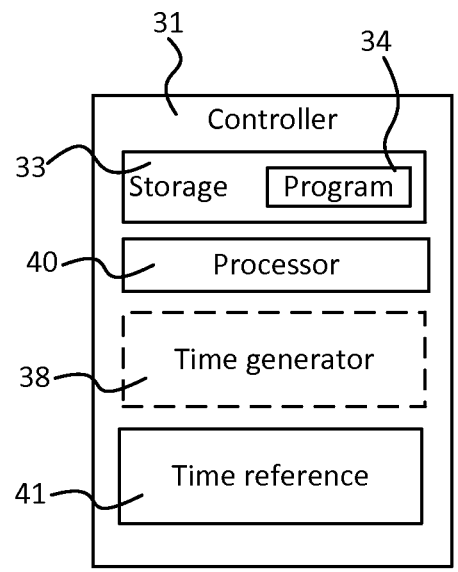
FIG. 3 is a schematic diagram of a controller apparatus according to aspects of the invention [this may be changed]

The sampler 25 is coupled to a controller 31. The controller 31 will now be discussed with reference to FIG. 3.

The controller 31 is configured to control the other components of the base station apparatus 30. The controller may take any suitable form. For instance, it may comprise processing circuitry 40, including one or more processors, and a suitable storage device 33, comprising a single memory unit or a plurality of memory units. The storage device 33 may comprise memory units of different types. The storage device 33 may store computer program instructions 34 that, when loaded into processing circuitry 40, control the operation of the base station 30. The computer program instructions 34 may provide the logic and routines that enables the apparatus to perform the functionality described above. The computer program instructions 34 may arrive at the apparatus 30 via an electromagnetic carrier signal or be copied from a physical entity such as a computer program product, a memory device or a record medium such as a CD-ROM or DVD.

The processing circuitry 40 may be any type of processing circuitry. For example, the processing circuitry 40 may be a programmable processor that interprets computer program instructions 34 and processes data. The processing circuitry 40 may include plural programmable processors. Alternatively, the processing circuitry 40 may be, for example, programmable hardware with embedded firmware. The processing circuitry 40 may be a single integrated circuit or a set of integrated circuits (i.e. a chipset). The processing circuitry 40 may also be a hardwired, application-specific integrated circuit (ASIC). The processing circuitry may be termed processing means.

The processing circuitry 40 is connected to write to and read from the storage device 33. The storage device 33 may be a single memory unit or a plurality of memory units. The storage device 33 may consist of portions of non-volatile storage and volatile storage such as RAM, ROM or FLASH or the like. The memory 33 may be implemented as a component, or it may be implemented as one or more separate components. Some or all of the components may be integrated/removable and/or may provide permanent/semi-permanent/dynamic/cached storage.

The controller 31 operates to control the switch 19 to connect the antenna elements 32A, 32B, 32C to the amplifier 21 in turn. The controller 31 controls the switch 19 to connect one of the antenna elements 32A, 32B, 32C to the Low Noise Amplifier (LNA) 21 for the duration of transmission of the header of a packet transmitted by the mobile device 10. After the header has been received, the controller 31 controls the switch 19 to connect a different one of the antenna elements 32A, 32B, 32C to the LNA 21 in a sequence. The interval between successive switching of the switch 19 is approximately equal to the symbol rate used in the payload of the transmitted packets.

An output of the controller 31 is provided to both a demodulator 26 and a message former 27. The demodulator 26 is configured to demodulate data modulated onto signals received by the antenna elements 32A, 32B, 32C and extract therefrom an identifier relating to a mobile tag that transmitted the received signals. This identifier is provided to the message former 27.

The controller 31 further comprises a time reference 41, for instance a clock.

The controller 31 further operates to control a Power Management Unit (PMU) 39, which is external to the controller.

The PMU 39 is coupled selectively to provide electrical power to the receiver circuit 37. The receiver circuit 37 comprises the switch 19, the LNA 21, the mixer 22, the sampler 25, the oscillator 23, and the phase shifter 24.

The PMU 39 is further coupled selectively to provide electrical power to at least the message former 27.

The PMU 39 comprises an internal switching circuit. The PMU 39 is configured to provide power to particular devices when instructed to do so by the controller 31.

The base station 30 may be coupled to the server (not shown) via an Ethernet cable. The base station 30 here may be powered by power-over-Ethernet.

In this embodiment, the controller 31 comprises a random number generator 38. The random number generator 38 is configured to generate an integer at random to be used by the processing circuitry 40. The processing circuitry 40 is configured to use the random number to generate a delay time, as follows:

$$T_d = N \times L_p$$

where $L_p$ is the length of one positioning packet, for example 0.3 milliseconds. N is the random integer. The random integer is in the range 0 milliseconds to $$\text{round}\left(\frac{d_{max}}{L_p}\right),$$

where $d_{max}$ is the maximum delay time. The maximum delay time is typically 5 milliseconds, where 5 milliseconds is equivalent to the time it takes to process a positioning packet.

The message former 27 may be integrated within the controller 31.

The message former 27 is configured to generate a message comprising I and Q samples of the downconverted signals from each of the antenna elements 32A, 32B, 32C and the identifier. The message is then passed to a transmitter 28, from where it is transmitted. The transmitter is incorporated within an Ethernet integrated circuit (chip) 29. The message may be transmitted via an Ethernet cable, to a central server for instance.

Alternatively the message may be transmitted wirelessly, for instance using radio signals. The radio signals may have a transmission range of 100 meters or less. For example, the radio frequency signals may be 802.11 wireless local area network (WLAN) signals, Bluetooth or Bluetooth Low Energy signals, Ultra wideband (UWB) signals or Zigbee signals. Here, the message may transmitted (e.g. broadcast) such that it can be received directly by the mobile telephone 10. Alternatively, the message may be transmitted or broadcast such that it can be received by a server (not shown). The server can be configured to perform the step of calculating a bearing from the base station 30 to the mobile device 10, and calculating the location of the mobile device.

However it is communicated, the message may be relayed by a device, for instance another base station receiver apparatus 30, before it reaches the destination of the mobile station 10 or the server.

The message may include plural positioning packets, each including a header and a payload. The headers of the packets include an identifier relating to and identifying the base station receiver apparatus 30. The payloads include the I and Q samples and the identifier demodulated from the signals received by the base station receiver apparatus 30. The I and Q samples and identifier relating to one signal received at the base station receiver apparatus 30 may be included in one positioning packet, or split across multiple positioning packets. One positioning packet may include I and Q samples and identifiers relating to two or more signals received at the base station receiver apparatus 30, although advantageously each packet relates to only one signal.

In a prototype system constructed by the inventors, sixteen antenna elements 32A are used. In this system, each antenna element is sampled twice although one antenna element (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Instead of transmitting 'raw' I and Q samples, the controller 31 may process the I and Q samples to provide other complex signal parameters relating to the received signals, from which bearing calculation can be performed. For instance, the controller 31 may provide averaging of the I and Q samples in the angle/phase domain before converting the averages back to the I and Q domain (one sample for each antenna) and providing the averaged samples as complex signal parameters. Alternatively, the controller 31 may calculate amplitude and/or phase information from the I and Q samples, and provide the amplitude, phase or phase and amplitude information as complex signal parameters Whatever form is taken by the complex signal parameters, they are included in a message as described above.

Figure 4:
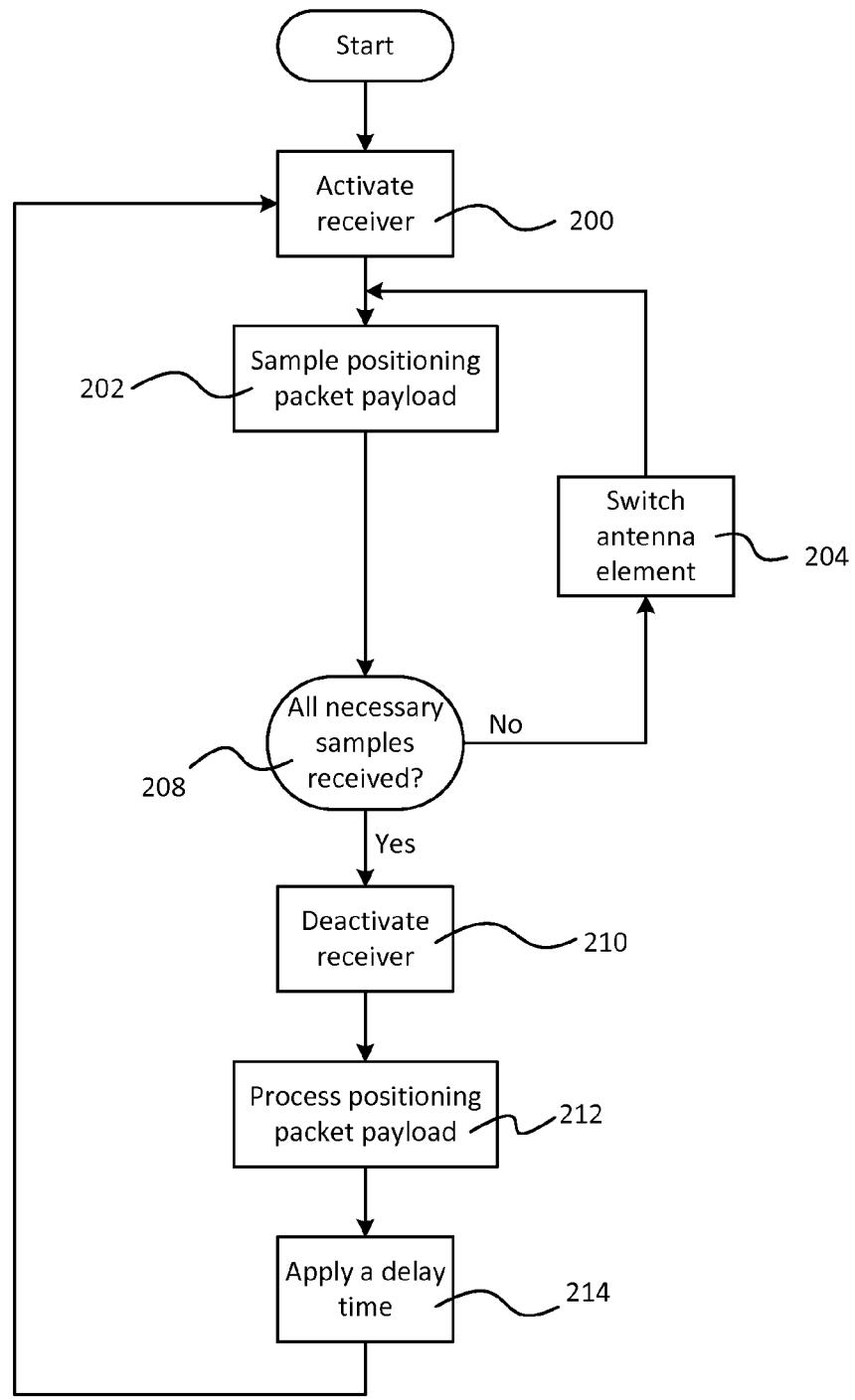
FIG. 4 is a flow chart illustrating operation of the FIG. 2 receiver apparatus according to aspects of the invention.

FIG. 4 is a flow chart illustrating operation of the receiver apparatus 30 according to aspects of the invention.

The receiver circuit 37 is activated in step 200. Sometime thereafter, a mobile device 10 transmits a positioning packet, which is incident on the base station receiver 30. The positioning packet includes a header and a payload. The header is received and decoded. This utilises only one of the antenna elements 32A-C. Sampling of the payload to obtain I and Q samples from different antenna elements 32A-C involves switching the switch 19 between the antenna elements 32A-C in sequence.

In step 202, a first sample of the positioning packet payload is taken using a first antenna element 32A. At step 208, it is determined whether all the necessary samples have been made. This step only produces a positive result when all the antenna elements have been sampled at least twice. On a negative result, the method proceeds to step 204. Here, the controller 31 operates to control the switch 19 to connect a different one of the antenna elements 32A-C to the LNA 21. After step 204, the method returns to step 202, where a further sample of the positioning packet payload is taken. This time, a second antenna element 32B is used because switching has taken place.

The method remains in a loop of steps 202 and 204 until step 208 yields a positive result. In the loop, the at least three antenna elements 32A, 32B, 32C are controlled to be connected by the switch 19 to the LNA 21 in turn. The controller 31 controls the switch 19 to connect a different one of the antenna elements 32A, 32B, 32C to the LNA 21 in any suitable sequence. The interval between successive switching of the switch 19 is approximately equal to the symbol rate used in the payload of the transmitted packets.

Once step 208 yields a positive determination, the receiver circuit 37 is deactivated in step 210. This involves the controller 31 controlling the PMU 39 to cease providing electrical power to the receiver circuit 37. Then, in step 212 the positioning packet is processed. Processing comprises transferring the I and Q samples from the chip comprising the analogue to digital converter to the Ethernet chip 29, and then for transferring that packet out. Processing also comprises message forming using the message former 27. Processing may also comprise the bearing calculation or beamforming.

Once the processing of step 212 is complete, the receiver circuit 37 is controlled by the controller 31, through the PMU 39, to remain off or deactivated for a further period of time. This period of time is referred to herein as the delay time. The delay time may be randomly or pseudo-randomly generated, or it may be a predetermined delay time. The delay time is typically between 0 and 5 milliseconds.

After the delay time has passed, in the controller 31 reactivates the receiver circuit 37 in step 200. This is effected by the controller controlling the PMU 39 to provide electrical power to the receiver circuit 37.

In embodiments in which the delay time is be randomly or pseudo-randomly generated, the value for the delay time is provided by the time generator 38.

In embodiments in which the delay time is predetermined, the controller 31 may not have a random time generator 38 but has a fixed delay time preprogrammed, for instance by being stored in the memory 33. The fixed delay time may be different for every base station apparatus 30. The fixed delay time may be preconfigured by the device manufacturer. Alternatively, the fixed delay time may be transmitted to the base station apparatus 30 after installation. Transmission of the fixed delay time to the base station apparatus 30 after installation may occur when the base station apparatus 30 is first initialised or following power-up, for instance.

Figure 5:
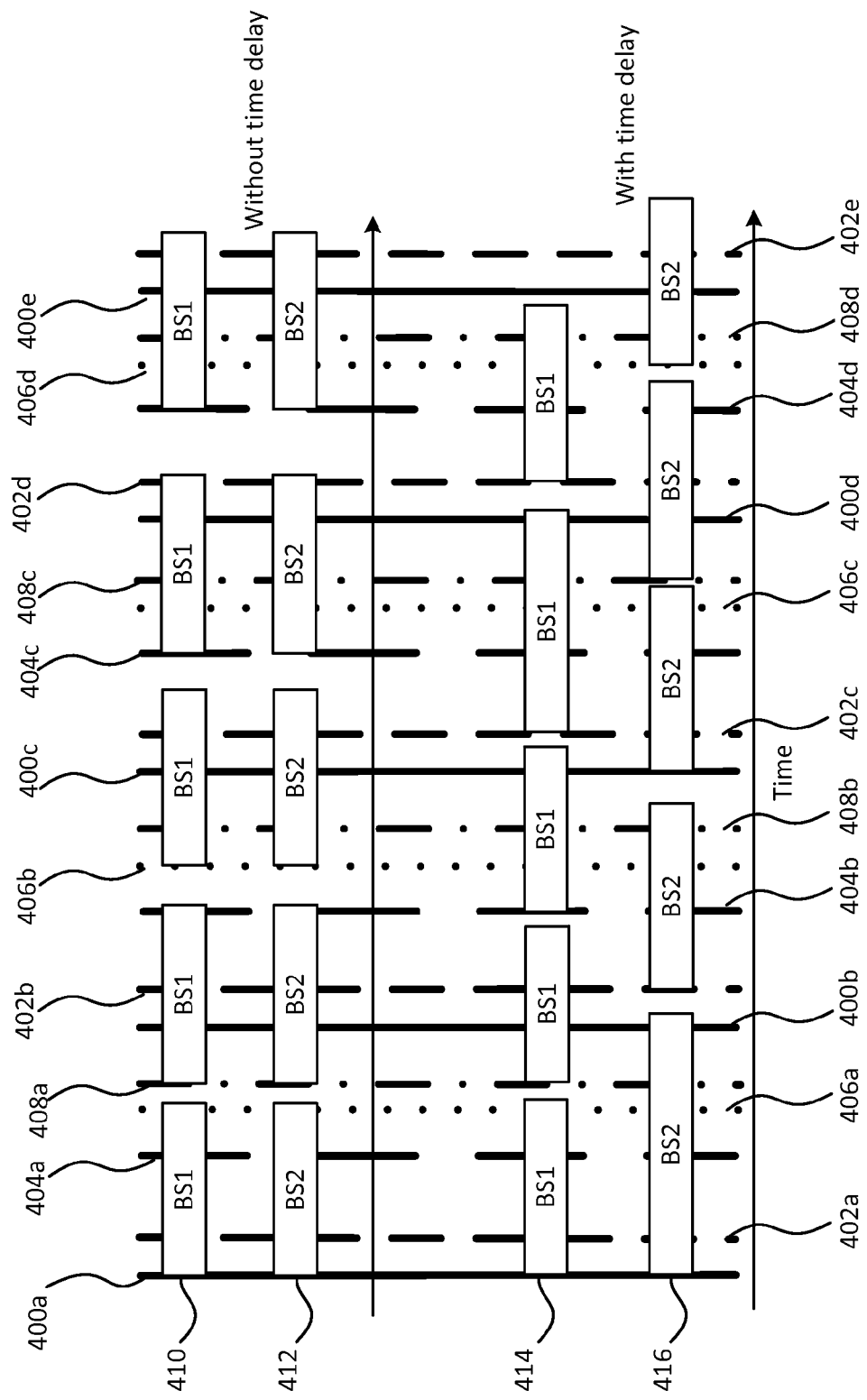
FIG. 5 is a timing diagram of operation of different ones of the FIG. 2 receiver.

FIG. 5 shows graphically the effect of the implementation of the method of FIG. 4.

Individual positioning packets 400a-e, 402a-e, 406a-e, and 408a-e are transmitted at intervals by the mobile devices 10. Each collection of positioning packets e.g. 400a-e represent individual mobile devices 10. Each mobile device 10 may transmit positioning packets at regular intervals or at intervals that are not strictly regular. Intervals 410, 412, 414, and 416 are the periods of time in which the base station 30 receiver circuits 37 are switched off. Intervals 410 and 414 represent a first base station, and intervals 412 and 416 represent a second base station. The positioning packets are only received by the base station 30 when it is switched on. It takes a finite period of time to receive a positioning packet 400a. If a second positioning packet is incident on the antenna elements whilst the first positioning packet is being received, a collision will occur and the first positioning packet will be discarded.

The positioning packet 400a immediately prior to each period of deactivation 410, 412, 414, 416 is the positioning packet that has been received and will be subsequently processed by the base station 30. Once the positioning packet 400a is received, the base station 30 receiver circuit 37 is switched off. For example, in the no additional delay example it can be seen that positioning packets 402a-e are never received by a base station 30.

In the no additional delay example shown at the top of the Figure, first and second base stations BS1 and BS2 are located nearby to one another. The base station 30 receiver circuit 37 receive the same positioning packet and then are switched off for the amount of time it takes to process the positioning packet payload. The base stations 30 then wake up at the same time, and thus receive the same positioning packets. Significantly, they also both miss the same positioning packets (packets are missed if they are transmitted whilst the base stations are processing another positioning packet). The no additional delay example shown at the top of the Figure is not part of the invention. The example shown at the bottom of the Figure is part of the invention. The no additional delay example is provided purely as a comparison against examples, including that at the bottom of the Figure, that are within the scope of the invention.

In the illustrated example that is part of the present invention, the base station 30 receiver circuits 37 are switched off for the amount of time it takes to process the positioning packet payload and a further delay time. As a result of this further delay time, all positioning packets 400a-e-408a-e are received by one of the two base stations 30. As such, positioning information can be calculated for each of the mobile devices 10. This is a result of the adding of the further delay time before switching on the receiver circuits 37. Particularly, this is a result of adding a delay that is different or likely to be different for neighbouring base stations 30.

In some embodiments, the delay time is random, which ensures that the delay time is different for neighbouring base stations almost every time. In other embodiments the delay time is preprogrammed in each base station 30. By ensuring that neighbouring base stations are preprogrammed with different delay times, it can be assured that neighbouring base stations will power up after receiving a given positioning packet at different times. In other embodiments, the delay time has a component that is preprogrammed and a component that is random. This helps to ensure different delay times for neighbouring base stations 30.

Of course, different delay times result in different power up times if the processing period is the same for different base stations (any difference in the time at which a positioning packet starts to be received is negligible).

An alternative solution to the problem of ensuring that positioning packets are received could be provided by providing more sophisticated hardware in the base stations. However, there is considerable advantage in allowing base stations 30 to be constructed with relatively basic hardware. As well as providing a lower implementation cost for a given installation, it also provides the possibility of increasing the number of base stations in an installation, thus increasing positioning accuracy or reducing time to a position fix, for a given cost. The base station hardware described with reference to FIG. 2 can be provided at very low cost.

Various alternatives and variations are conceivable and all such variations and alternatives are within the scope of the invention unless outside the scope of the claims. Some such alternatives will now be described.

For instance, in other embodiments, the receiver circuit 37 is not switched off during the processing period and the delay period. In these embodiments, newly received positioning packets are ignored by the processor such that the packets currently being processed are not overwritten in memory. For instance, in these other embodiments, the ADC 25 may be disabled or a memory controller (not shown) may be configured not to record samples provided by the ADC. These embodiments comprise deactivation of the receiver circuit 37 without requiring it to power down.

To paraphrase, the method above comprises receiving a data packet at a positioning device. The packet is begun to be received at step 200 of FIG. 4. Upon receiving the data packet, a receiver circuit of the positioning device is deactivated for a period of time at step 210, the period of time constituting a sum of a time taken by the positioning device to process the data packet and a preconfigured or random delay time. The delay time is applied in step 214. The packet is processed according to step 212 by: obtaining complex signal parameters of signals received at each of at least three antenna elements forming part of the positioning device, and extracting an identifier from the data packet. Obtaining complex signal parameters is multiple executions of step 202. The receiver circuit of the positioning device is activated again immediately subsequent the period of time.

In further embodiments, the base station apparatus 30 may be powered by a fixed mains electricity source. Alternatively, the base station apparatus 30 may be battery powered.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

The invention claimed is:

1. A method comprising:
receiving a signal comprising a positioning packet at a base station;
processing the signal by:
demodulating a header of the positioning packet from the signal;
extracting an identifier from the header of the positioning packet;
part processing samples of the signal; and
forming a message from the part-processed samples;
in response to receiving the signal, deactivating a receiver circuit of the base station for a period of time, the period of time comprising a time taken by the base station to process the signal and a delay time; and
activating the receiver circuit of the base station subsequent the period of time.

2. The method of claim 1, wherein the delay time is a preconfigured delay time.

3. The method of claim 1, wherein the delay time of a receiver circuit in a positioning device is different to that of the base station.

4. The method of claim 1, wherein the delay time is a random delay time.

5. The method of claim 4, wherein the delay time is less than 10 milliseconds.

6. The method of claim 4, wherein the delay time is less than 5 milliseconds.

7. The method of claim 1, wherein the delay time comprises a preconfigured delay time part and a random delay time part.

8. A base station comprising at least one processor and at least one memory including computer program code, the at least one memory and the computer program code configured to, with the at least one processor, cause the base station at least to perform:

receive a signal comprising a positioning packet at the base station;
process the signal to:
demodulate a header of the positioning packet from the signal;
extract an identifier from the header of the positioning packet;
part process samples of the signal; and
form a message from the part-processed samples;
in response to receiving the signal, deactivate a receiver circuit of the base station for a period of time, the period of time comprised of a time taken by the base station to process the signal and delay time; and
activate the receiver circuit of the base station subsequent the period of time.

9. The base station of claim 8 wherein the delay time comprises a preconfigured delay time.

10. The base station of claim 8 wherein the delay time comprises a random delay time.

11. A base station, comprising:
a receiver configured to receive a signal comprising a positioning packet at the base station;
a processing arrangement configured to process the signal to:
demodulate a header of the positioning packet from the signal;
extract an identifier from the header of the positioning packet;
part process samples of the signal; and
form a message from the part-processed samples;
a deactivate arrangement configured, in response to the signal, to deactivate a receiver circuit of the base station for a period of time, the period of time comprised of a time taken by the base station to process the signal and a delay time; and
an activate arrangement configured to activate the receiver circuit of the base station subsequent the period of time.

12. The base station of claim 11, wherein the delay time is a preconfigured delay time.

13. The base station of claim 11, wherein the delay time of a receiver circuit in a positioning device is different to that of the base station.

14. The base station of claim 11, wherein the delay time comprises at least in part a random delay time.

15. The base station of claim 11, wherein the delay time comprises a random delay time that is less than 10 milliseconds.

16. The base station of claim 11, wherein the delay time comprises a random delay time that is less than 5 milliseconds.

17. A non-transitory computer readable storage medium in which computer program code is stored, the computer program code causing a base station to perform the following when executed by a processor:
demodulating a header of a positioning packet from a received signal;
extracting an identifier from the header of the positioning packet;
part processing samples of the signal; and
forming a message from the part-processed samples;
a deactivating arrangement configured, in response to receiving the signal, to deactivate a receiver circuit of the base station for a period of time, the period of time comprising a time taken by the base station to process the signal and a delay time; and
an activating arrangement configured to activate the receiver circuit of the base station subsequent the period of time.

18. The medium of claim 17, wherein the delay time comprises at least in part a preconfigured delay time.

19. The medium of claim 17, wherein the delay time comprises at least in part a random delay time.

* * * * *